(12) United States Patent
Tagawa

(10) Patent No.: US 6,521,878 B2
(45) Date of Patent: Feb. 18, 2003

(54) RADIAL TILT DETECTOR FOR AN OPTICAL DISC

(75) Inventor: Yukihiro Tagawa, Yokohama (JP)

(73) Assignee: Samsung Electro-Mechanics Co., Ltd., Kyunggi-do (KR)

(*) Notice: Subject to any disclaimer, the term of this patent is extended or adjusted under 35 U.S.C. 154(b) by 0 days.

(21) Appl. No.: 09/821,740

(22) Filed: Mar. 30, 2001

(65) Prior Publication Data

US 2002/0043634 A1 Apr. 18, 2002

(30) Foreign Application Priority Data

Sep. 1, 2000 (JP) ........................ 2000-266252

(51) Int. Cl.[7] ................. G02B 27/40; G02B 27/64; G02B 7/04; G11B 7/00; G11B 11/105
(52) U.S. Cl. ............... 250/201.5; 369/44.32; 369/53.19
(58) Field of Search .............. 250/231.1, 33, 250/514.01, 201.5; 340/689; 33/365, 366.23; 369/44.32, 53.19, 53.12

(56) References Cited

U.S. PATENT DOCUMENTS

| 4,850,695 A | * | 7/1989 | Mikuriya et al. ............ 250/201 |
| 5,483,512 A | * | 1/1996 | Yanagawa ................. 369/44.32 |
| 6,125,088 A | * | 9/2000 | Ogasawara ............... 369/44.32 |

* cited by examiner

Primary Examiner—Georgia Epps
Assistant Examiner—Alicia M. Harrington
(74) Attorney, Agent, or Firm—Morgan, Lewis & Bockius LLP

(57) ABSTRACT

A radial tilt detector for an optical disc includes a first system for measuring a first average velocity vector of a light beam on a recording surface of the optical disc along a focusing direction of the light beam, a second system for measuring a second average velocity vector of the light beam on the recording surface of the optical disc along a radial direction of the optical disc, a third system for calculating a resultant vector of the measured first and second velocity vectors, and a fourth system for calculating the radial tilt angle of the optical disc using the measured first average velocity, the measured second average velocity, and the calculated resultant vector.

5 Claims, 4 Drawing Sheets motor (a)　(b)　(c)

RADIAL TILT DETECTOR FOR AN OPTICAL DISC

BACKGROUND OF THE INVENTION

1. Field of the Invention

The present invention relates in general to tilt detectors for optical head tilt servo devices in optical disc players and the like, and more particularly to a radial tilt detector for detecting a tilt in a radial direction of an optical disc.

2. Description of the Prior Art

An optical disc apparatus is generally adapted to project a small and narrow beam of light on an optical disc through an object lens to scan a fine mark (recoiling mark) on the disc so as to reproduce information recorded thereon. At this time, the surface of the optical disc may be tilted relative to a beam of light from an optical head due to a distortion of the disc, a surface vibration, etc. In this case, the beam of light from the optical head is incident on the surface of the optical disc to reproduce information recorded thereon, while being tilted relative to the also surface, thereby making it difficult to accurately read the recorded information.

FIG. 5 shows variations is tilt of a spot of light formed on the surface of an optical disc by a beam of light, relative to the disc surface. In particular, the lower part of FIG. 5 shows the shapes of the light spot and the upper part thereof shows light intensity distributions of the spot.

In more detail, FIG. 5b shows the shape and intensity distribution of the light spot when the light beam is perpendicular to the disc surface. In this drawing, the light spot is shown to have a symmetrical shape. FIGS. 5a and 5c show the shapes and intensity distributions of the light spot when the disc surface is tilted relative to the light beam. In each of these drawings, a coma-aberration is generated in the light spot on the disc, and the light spot has an asymmetrical shape.

For the purpose of preventing the above coma-aberration, the optical disc apparatus comprises a tilt servo device for correcting a tilt of an optical axis of the optical head to maintain the optical axis perpendicular to the disc surface. The tilt servo device includes tilt detection means for detecting the amount of a tilt of a beam of light projected from the optical head relative to the disc surface.

A tilt sensor is generally used to detect a tilt amount. This tilt sensor is conventionally installed in the tilt detection means separately from an optical system which generates a beam of light for reproduction of information recorded on the optical disc. In this construction the tilt sensor must be spaced apart from the object lens of the optical head at a certain distance in order to avoid an interference therebetween. However, the tilt sensor and the object lens of the optical head must become closer to each other to obtain a more approximate value to a tilt amount of a projected position of a light spot on the disc surface relative to the surface.

FIG. 6 is a perspective view showing an example of the construction of a head part in a conventional optical disc apparatus. A head part 102 is positioned under an optical disc 101, and an object lens 103 of an optical head and a tilt sensor 104 of tilt detection means are arranged on the upper surface of the head part 102. The tilt sensor 104 is arranged on the upper surface of the head part 102 in such a manner that a spot of light 106 formed by a beam of light 105 emitted from the object lens 103 passes therethrough and is substantially aligned therewith on a track 107 of the disc surface. Through this arrangement, the tilt sensor can approximately detect the position of the light spot 106 and the tilt amount of the disc surface.

However, in the head part with the above-mentioned construction, because the light spot and the tilt sensor are not perfectly aligned with each other, it is inevitable tact a value detected by the tilt sensor is in error. This cannot guarantee a sufficient degree of precision, for example, when a high decree of tilt correction is required according to a recording densification of the disc.

Further, because the optical head and tilt detection means are provided separately, the number of components increases, resulting in an increase in cost and a complexity in the construction of the head part.

SUMMARY OF THE INVENTION

Therefore, the present invention has been made in view of the above problems, and it is an object of the present invention to provide a radial tilt detector which is capable of detecting a tilt in a radial direction of an optical disc at a high degree of precision and being cost-effective and simple in head part construction.

In accordance with one aspect of the present invention, the above and other objects can be accomplished by the provision of a radial tilt detector adapted to, by measuring an average velocity, excluding a variation occurring at regular periods, of a spot position on a recording surface of an optical disc at which a beam of light is condensed, in a focusing direction of the optical disc and an average velocity, excluding a variation occurring at regular periods, of the spot position in a radial direction of the optical disc calculate an angle defined by three vectors, or an average velocity vector in the focusing direction of the optical disc, an average velocity vector is the radial director of the optical disc and in a perpendicular direction to the focusing direction of the optical disc and a resultant vector of the average velocity vector in the focusing direction of the optical disc and the average velocity vector in the radial direction of the optical disc and detect a radial tilt angle on the basis of the calculated angle, the radial tilt angle being a tilt angle in the radial direction of the optical disc.

In accordance with another aspect of the present invention, there is provided a radial tilt detector for an optical disc information recording/reproduction apparatus which includes an optical head for projecting a condensed beam of light on a recording surface of a rotating optical disc and receiving the projected beam of light reflected from the recording surface of the optical disc, a focus actuator for focusing the condensed beam of light on its projected position of the recording surface of the optical disc, and drive means for outputting a drive signal to drive the focus actuator, the radial tilt detector being adapted to detect a radial tilt which is a tilt amount in a radial direction of the recording surface of the optical disc and comprising velocity detection means responsive to the drive signal from the drive means for detecting a velocity in a direction depending on an optical axis of the light beam at the position focused by the focus actuator; and radial tilt calculation processing means for calculating the radial tilt on the basis of the velocity detected by the velocity detection means and the number of rotations of the optical disc.

Preferably, the radial tilt calculation processing means may include a low pass filter for averaging the velocity detected by the velocity detection means for a predetermined period of time: multiplication means for multiplying the number of rotations of the optical disc by a track pitch which is an interval between adjacent tracks of the recording surface of the optical disc; division means for dividing the output of the low pass filter by the output of the multiplication means and outputting the divided result; and arctangent calculation means for taking, an arctangent of the output of the division means and outputting the resulting value as the radial tilt.

As an alternative, the radial tilt calculation processing means may include coefficient multiplication means instead of the arctangent calculation means, the coefficient multiplication means multiplying the output of the division means by a certain coefficient and obtaining the radial tilt as a result of the multiplication.

BRIEF DESCRIPTION OF THE DRAWINGS

The above and other objects features and advantages of the present invention will be more clearly understood from the following detailed description taken in conjunction with the accompanying drawings in which.

DETAILED DESCRIPTION OF THE PREFERRED EMBODIMENTS

First, the principle of the present invention will be described. The tilt of an optical disc is generally classified into a radial tilt, or a tilt in a radial direction of the disc, and a tangential tilt, or a tilt in a tangential direction of a track of the disc. A description will hereinafter be given of the radial tilt.

The radial tilt includes a planar component and an inverted U-shaped (or inverted V-shaped; component. The planar component may be a concentric spherical component and other radial component resulting from a surface vibration. Namely, the planar component may be, for example, a radial tilt component resulting from a surface vibration due to a disc deformation of an error is a disc information recording/reproduction apparatus, or from a planar disc deformation. The inverted U-shaped or V-shaped component may result from a concentric disc distortion about the rotation axis of the disc. That is, this inverted U-shaped or V-shaped component is generated on the basis of only a disc distortion.

Figure 1A:
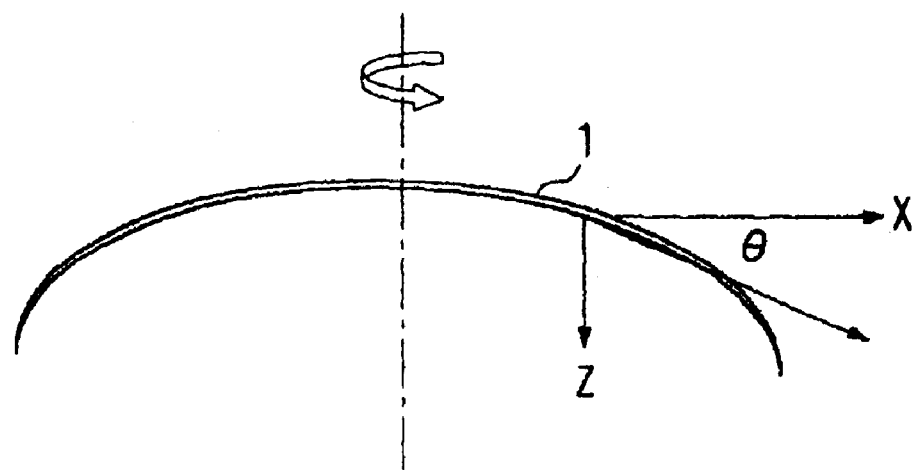
FIGS. 1a and 1b are views illustrating an offset angle based on an inverted U-shaped for inverted V-shaped; component of a tilt in a radial direction of an optical disc and a tilt of a rotation axis of a motor for rotating the optical disc.
Figure 1B:
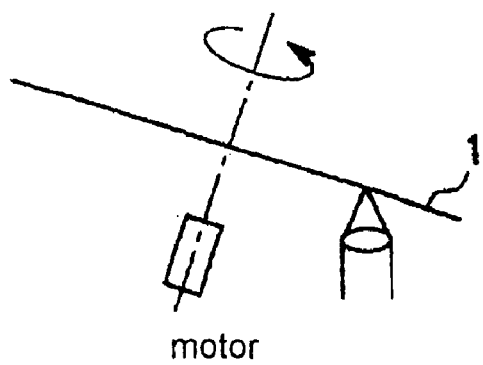

This invention relates to a device for detecting an offset angle based on an inverted U-shaped component of a tilt in a radial direction of an optical disc 1, as shown is FIG. 1a, among the above components, and a tilt of a rotation axis of a motor for rotating the optical disc 1, as shown is FIG. 1b, which motor is installed in an apparatus for recording and reproducing information on/from the optical disc 1. In this apparatus for recording and reproducing information on/from the optical disc 1, the disc 1 rotates, a spot of light, which is emitted from an optical pickup and condensed by a lens, is projected on a track of the rotating disc 1, and the projected light spot scans the track of the rotating disc. Accordingly, the position of the light spot in the radial direction. (X direction in FIG. 1a) of the optical disc 1 moves gradually in the radial direction of the disc 1 as the light spot scans the track of the disc 1.

At this time, if the surface of the optical disc is tilted relative to the light beam emitted from the optical head, the light spot also moves in a direction (Z direction in FIG. 1a) depending on an optical axis of the light beam.

Hereinafter, assume that the optical disc 1 has inverted U-shape resulting from a distortion, as shown in FIG. 1a. In other words, assume that the optical disc 1 has only an inverted U-shaped on V-shaped component and its surface is curved symmetrically on the basis of its rotation axis. It is also assumed that the position of the light spot is the radial direction of the optical disc is X and the position of the light spot in the direction depending on the optical axis of the light beam from the optical pickup is Z. If Z=f(X) and X=g(t), the following equation 1 can be established:

$$\frac{dZ}{dX} = \frac{\frac{dZ}{dt}}{\frac{dX}{dt}} \qquad \text{[Equation 1]}$$

Accordingly, a radial tilt angle θ satisfies the following equation 2:

$$\tan\theta = \frac{dZ}{dX} = \frac{\frac{dZ}{dt}}{\frac{dX}{dt}} \qquad \text{[Equation 2]}$$

Because the displacement X of the light spot in the X direction is expressed by the above equation X=g(t), the velocity of the light spot in the X direction can be obtained from the below equation 3:

$$\frac{dX}{dt} = \frac{V_l}{2\pi r}\mu = \frac{r\omega}{2\pi r}\mu = f\mu \qquad \text{[Equation 3]}$$

where, X: radial displacement, $V_1$: linear velocity, f: rotation frequency, $\mu$: track pitch and r: distance between disc center and light spot.

The velocity of the light spot in the Z direction is obtained by differentiating the position Z in the above equation Z=f(X) with time t. Although the tilt in the radial direction of the optical disc 1 is assumed herein to have only the inverted U-shaped (or inverted V-shaped) component, it is common that the radial tilt actually has a planar component as well as the inverted U-shaped for inverted V-shaped) component. In this regard, the offset value based on the inverted U-shaped (or inverted V-shaped) component and the tilt of the rotation axis of the motor as stated above can be extracted from a detected value of the radial tilt by eliminating the planar component from the detected value. To this end, the Z-direction velocity can be averaged for one rotation of the optical disc in consideration of the fact that the planar component has a period of one rotation of the disc 1. That is, the average of the Z-direction velocity based on the planar component for one rotation of the optical disc 1 is 0.

As a result, the radial tilt angle θ except for the planar component can be obtained in the following order. First, the equation 3 is substituted into the equation 1. Then, the average of the Z-direction velocity for one rotation of the optical disc 1 of defined as $dZ_a/dt$. Under this condition, substituting the equation 1 into the equation 2, the below equation 4 can be obtained:

$$\tan\theta = \frac{\frac{dZ_o}{dt}}{f\mu} \qquad \text{[Equation 4]}$$

Hence, the radial tilt angle θ including no planar component can be obtained from the below equation 5:

$$\theta = \tan^{-1}\frac{\left(\frac{dZ_o}{dt}\right)}{f\mu} \qquad \text{[Equation 5]}$$

Figure 2:
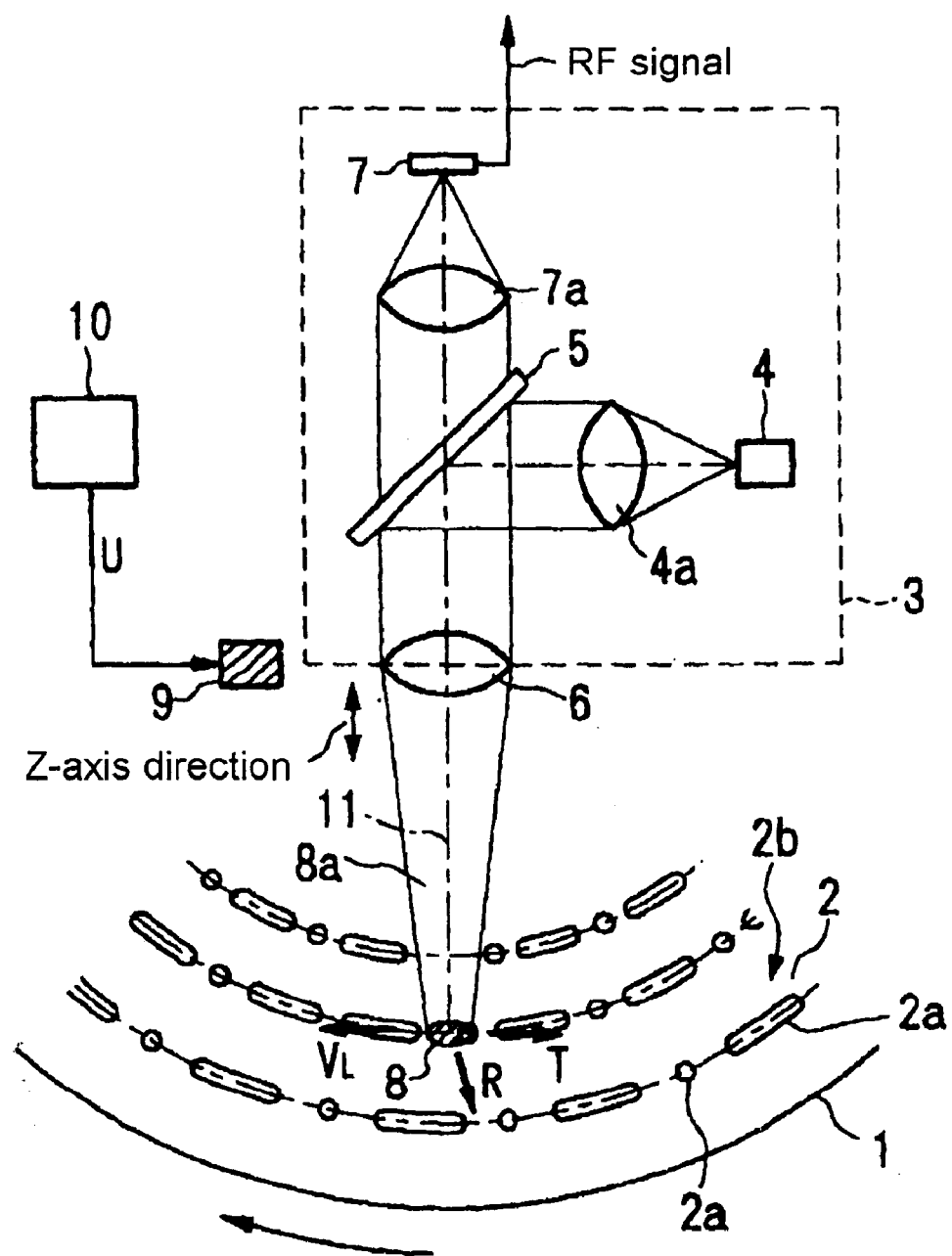
FIG. 2 is a view showing the overall construction of an apparatus for recording and reproducing information on/from an optical disc, to which this invention is applied.

FIG. 2 is a view showing the overall construction of an apparatus for recording and reproducing information on/from an optical disc, to which this invention is applied. A pit 2a is formed on a track 2 of an optical disc 1 on which information to be reproduced is recorded. A head 3 for reproducing the recorded information is arranged at a position facing a surface on which the pit 2a is formed.

The head 3 is movable in a radial direction R of the optical disc 1 by moving means, not shown. A Spot of light 8 is projected on the track 2 of the optical disc 1 by a beam of light 8a emitted from the head 3. The moving means moves a radial position of the light spot 2 with rotation of the optical disc 1, thereby enabling the spot 8 to scan the track 2.

The head 3 includes a laser diode 4 for emitting a beam of laser light, a collimating lens 4a for transforming the beam of laser light emitted from the laser diode 4 into a collimated beam of light, a beam splitter 5, an object lens 6 for receiving the collimated beam of light from the collimating lens 4a through the beam splitter 5, condensing it on a recording surface 2b of the optical disc 1 on which the pit, 2a is formed and collimating a beam of light reflected from the recording surface 2b, a collimating lens 7a for condensing the reflected beam of light collimated by the object lens 6, and a sensor 7 for receiving the reflected beam of light condensed by the collimating lens 7a.

The laser diode 4 emits a beam of laser light, which is then collimated by the collimating lens 4a, reflected by the beam splitter 5 and condensed by the object lens 6, resulting in the formation of a beam of light 8a. Then, a spot of light 8 is projected on the tract 2 of the optical disc 1 by the light beam 8a. This light beam is then intensity-modulated and reflected by the pit 2a on the track 2 to the beam splitter 5 via the object lens 6. Thereafter, the reflected beam of light is transmitted to the collimating lens 7a through the beam splitter 5, condensed by the collimating lens 7a and then received by the sensor 7. The sensor 7 outputs a radio frequency (RF) signal corresponding to the receives light beam, or the light beam intensity-modulated by the pit 2a.

The object lens 6 in the head 3 is driven in a parallel direction with an optical axis 11 of the light bean 8a namely, in a X-axis direction by a focus actuator 9, thereby causing the light spot 8 to be focused on the track 2. A driver 10 is provided to drive the focus actuator 9.

Next, a description will be given of an embodiment of a radial tilt detector in accordance wish the present invention with reference to FIG. 3. The driver 10 outputs a drive signal U (drive current or drive voltage) to the focus actuator 9, which then outputs a positioning signal Y in response to the drive signal U.

The drive signal U and positioning signal Y are applied to an observer 11, which includes a focus actuator model 12 and subtractor 13. The drive signal U is applied to the focus actuator model 12 and the positioning signal Y is applied to the subtractor 13, which also receives an output signal 12a from the focus actuator model 12. The subtractor 13 subtracts the output signal 12a from the focus actuator model 12 from the positioning signal Y and feeds the subtracted result back to the focus actuator model 12.

The focus actuator model 12 outputs a positioning signal Z indicative of the Z-axial driving of the object lens 6 and a velocity signal dZ/dt. These signals represent the position and velocity of the object lens 6 in the Z-axis direction, respectively. Further, the positioning signal Z and velocity signal dZ/dt represent the position and velocity of a point on the recording surface 2b of the optical disc 1 at which the bear, of light 8a from the object lens 6 is emitted and condensed, respectively.

The condensed point of the light beam 8a is controlled such that it is always positioned on the recording surface 2b of the optical disc 1. This control operation is performed by control means, not shown, which controls the driver 10 to vary the level of the drive signal U. As a result, the condensed point of the light beam 8a is always the same as a contact point of the light beam 8a and the recording surface 2b of the optical disc 1.

The velocity signal dZ/dt from the focus actuator model 12 is applied to a radial tilt calculation processor 16, which also receives a signal indicative of an offset angle based on as inverted U-shaped (or V-shaped) component of a radial tilt, excluding a planar component, and a tilt of a rotation axis of a motor for rotating the optical disc 1.

Figure 3:
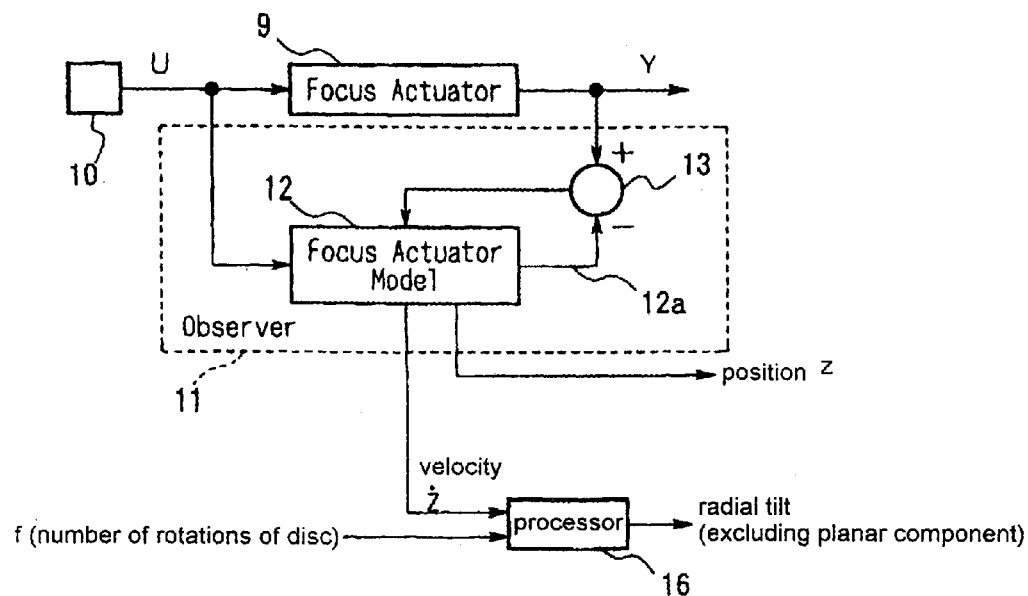
FIG. 3 is a block diagram showing an embodiment of a radial tilt detector in accordance with the present invention.
Figure 4:
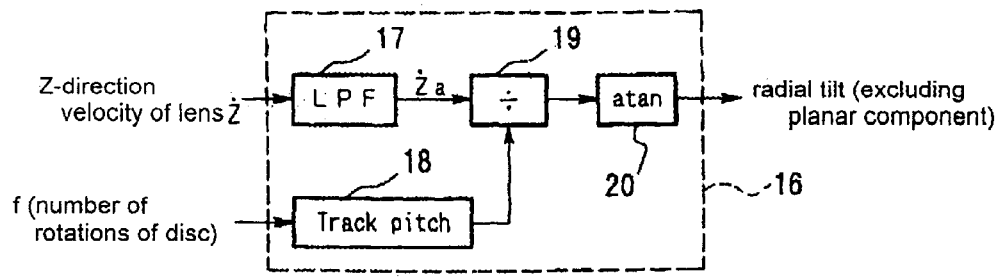
FIG. 4 is a detailed block diagram of a radial tilt calculation processor in FIG. 3.
Figure 5:
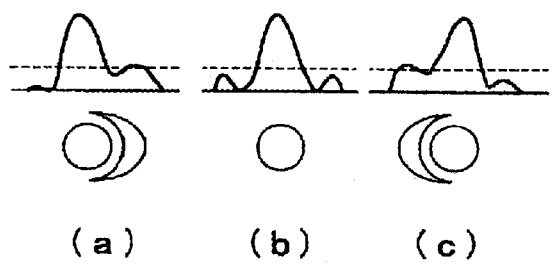
FIGS. 5a to 5c are views showing variations in tilt of a spot of light formed on the surface of an optical disc by a beam of light, relative to the disc surface.
Figure 6:
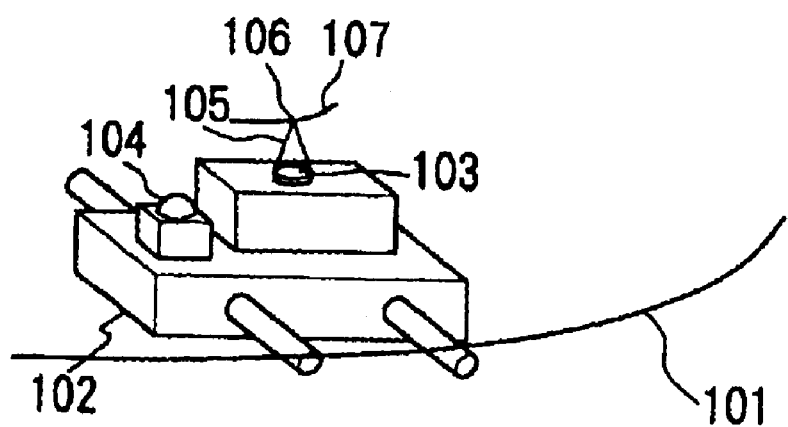
FIG. 6 is a perspective view showing an example of the construction of a head part in a conventional optical disc apparatus.

FIG. 4 is a detailed block diagram of the radial calculation processor 16 in FIG. 3. The construction and operation of the radial tilt calculation processor 16 will hereinafter be described with reference to FIG. 4. The radial tilt calculation processor 16 includes a low pass filter 17, multiplier 18, divider 19 and arctangent calculator 20.

The low pass filter 17 receives the velocity signal dZ/dt imitative of the Z-direction moving velocity of the object lens 6, or the Z-direction moving velocity of the light spot, and obtains the average $dZ_a/dt$ of the velocity for one rotation of the optical disc 1. The multiplier 18 receives a signal f indicative of the number of rotations of the optical disc 1, provided from specific means, not shown. The multiplier 18 then multiplies the number f of rotations by a track pitch $\mu$ and outputs the multiplied result as an X-direction velocity value $f\mu$.

The divider 19 divides the output $d2_a/dt$ of the low pass filter 17 by the output $f\mu$ of the multiplier 18 and outputs the resulting value $(dZ_a/dt)/(f\mu)$. The arctangent calculator 20 receives the output $(dZ_a/dt)/(f\mu)$ of the divider 19, takes an arctangent thereof, namely, $\tan^{-1}\{(dZ_a/dt)/(f\mu)\}$ and outputs the resulting value as a radial tilt angle θ.

As an alternative, a coefficient multiplier may be provided instead of the arctangent calculator 20 to multiply the output of the divider 19 by a certain coefficient and obtain the radial tilt angle θ as a result of the multiplication. The reason is that, for a fine radial tilt angle θ, the arctangent of the output $(dZ_a/dt)/(f\mu)$ of the divider 19 is substantially equal to the multiplication of the output $(dZ_a/dt)/(f\mu)$ of the divider 19 by a coefficient.

As apparent from the above description, the present invention provides a radial tilt detector which is capable of detecting a tilt in a radial direction of an optical disc at a high degree of precision and being cost-effective and simple in head part construction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A radial tilt detector for an optical disc information recording/reproduction apparatus which includes an optical head for projecting a condensed beam of light on a recording surface of a rotating optical disc and receiving the projected beam, of light reflected from said recording surface of said optical disc, a focus actuator for focusing said condensed beam of light an its projected position of said recording surface of said optical disc, and drive means for outputting a drive signal to drive said focus actuator, said radial tilt detector being adapted to detect a radial tilt which is a tilt amount in a radial direction of said recording surface of said optical disc and comprising:

velocity detection means responsive to said drive signal from said drive means for detecting a velocity in a direction depending en an optical axis of said light bean at said position focused by said focus actuator; and radial tilt calculation processing means for calculating said radial tilt on the basis of said velocity detected by said velocity detection means and the number of rotations of said optical disc.

2. The radial tilt detector as set forth in claim 1, wherein said radial tilt calculation processing means includes:

a low pass filter for averaging said velocity detected by said velocity detection means for a predetermined period of time;

multiplication means for multiplying the number of rotations of said optical disc by a track pitch which is an interval between adjacent tracks of said recording surface of said optical disc;

division means for dividing the output of said low pass filter by the output of said multiplication means and outputting the divided result; and arctangent calculation means for taking an arctangent of the output of said division means and outputting the resulting value as said radial tilt.

3. The radial tilt detector as set forth in claim 2, wherein said radial tilt calculation processing means includes coefficient multiplication means instead of said arctangent calculation means, said coefficient multiplication means multiplying said output of said division means by a certain coefficient and obtaining said radial tilt as a result of the multiplication.

4. A radial tilt detector for an optical disc, comprising;

a first system for measuring a first average velocity vector of a light beam on a recording surface of the optical disc along a focusing direction of the light beam;

a second system for measuring a second average velocity vector of the light beam on the recording surface of the optical disc along a radial direction of the optical disc;

a third system for calculating a resultant vector of the measured first and second velocity vectors; and a fourth system for calculating the radial tilt angle of the optical disc using the measured first average velocity, the measured second average velocity, and the calculated resultant vector.

5. A method for determining a radial tilt angle of an optical disc, comprising:

measuring a first average velocity vector of a light beam on a recording surface of the optical disc along a focusing direction of the light beam;

measuring a second average velocity vector of the light beam on the recording surface of the optical disc along a radial direction of the optical disc;

calculating a resultant vector of the measured first and second velocity vectors; and calculating the radial tilt angle of the optical disc using the measured first average velocity, the measured second average velocity, and the calculated resultant vector.

* * * * *